(12) United States Patent
Wu

(10) Patent No.: US 8,128,820 B2
(45) Date of Patent: Mar. 6, 2012

(54) UV LIQUID STORAGE AND DISPENSING DEVICE

(75) Inventor: Ka Shing Wu, Kwun Tong (HK)

(73) Assignee: Mr. Chiaphua Industries Limited, Tai Po, New Territories, N.T. (HK)

( * ) Notice: Subject to any disclaimer, the term of this patent is extended or adjusted under 35 U.S.C. 154(b) by 559 days.

(21) Appl. No.: 12/380,191

(22) Filed: Feb. 25, 2009

(65) Prior Publication Data

US 2010/0215552 A1    Aug. 26, 2010

(51) Int. Cl.
*C02F 1/28* (2006.01)
*C02F 1/32* (2006.01)
*C02F 1/42* (2006.01)

(52) U.S. Cl. .......... 210/251; 210/85; 210/232; 210/282; 210/473; 210/482; 210/748.11; 210/660; 210/694; 210/260; 422/186.3

(58) Field of Classification Search ................ None
See application file for complete search history.

(56) References Cited

U.S. PATENT DOCUMENTS

| | | | | |
|---|---|---|---|---|
| 103,592 A * | 5/1870 | Farson | ............... | 210/456 |
| 321,877 A * | 7/1885 | Abell | ............... | 210/306 |
| 421,777 A * | 2/1890 | Stanton | ............... | 141/18 |
| 444,013 A * | 1/1891 | Paddock | ............... | 210/473 |
| 466,809 A * | 1/1892 | Stone | ............... | 210/306 |
| 498,967 A * | 6/1893 | Benham | ............... | 210/244 |
| 513,802 A * | 1/1894 | Luscombe | ............... | 210/476 |
| 537,489 A * | 4/1895 | Sherwood | ............... | 210/290 |
| 647,580 A * | 4/1900 | Parker | ............... | 210/467 |
| 648,904 A * | 5/1900 | Hart | ............... | 62/319 |
| 651,948 A * | 6/1900 | Lawson | ............... | 210/476 |
| 673,722 A * | 5/1901 | Moulton | ............... | 210/266 |
| 872,407 A * | 12/1907 | Donahoe | ............... | 210/467 |
| 967,905 A * | 8/1910 | Hagg | ............... | 210/301 |
| 1,157,776 A * | 10/1915 | Hagg | ............... | 210/457 |
| 1,157,927 A * | 10/1915 | Davis | ............... | 62/319 |
| 1,208,882 A * | 12/1916 | Young | ............... | 210/247 |
| 1,284,233 A * | 11/1918 | Caen | ............... | 210/323.1 |
| 1,357,744 A * | 11/1920 | Taub | ............... | 222/189.07 |
| 1,432,522 A * | 10/1922 | Barnes | ............... | 62/311 |
| 1,579,158 A * | 3/1926 | Smilie | ............... | 210/436 |
| 1,621,684 A * | 3/1927 | Rabjohn et al. | ............... | 210/266 |
| 1,629,269 A * | 5/1927 | Hagg | ............... | 210/282 |
| 1,645,712 A * | 10/1927 | Meyers | ............... | 210/265 |
| 1,674,203 A * | 6/1928 | Holz et al. | ............... | 210/266 |
| 1,752,060 A * | 9/1930 | Burright et al. | ............... | 210/261 |
| 1,834,045 A * | 12/1931 | Breuil | ............... | 210/288 |
| 2,167,225 A * | 7/1939 | Van Eweyk | ............... | 210/266 |
| 2,183,773 A * | 12/1939 | Lehman | ............... | 210/467 |
| 2,335,458 A * | 11/1943 | Senyal | ............... | 210/257.1 |
| 2,372,340 A * | 3/1945 | Senyal | ............... | 210/257.1 |
| 2,389,185 A * | 11/1945 | Dick | ............... | 210/472 |
| 2,742,849 A * | 4/1956 | Stiglitz | ............... | 99/299 |

(Continued)

*Primary Examiner* — Robert James Popovics
(74) *Attorney, Agent, or Firm* — Alix, Yale & Ristas, LLP

(57) ABSTRACT

A liquid storage and dispensing device with a filter for removing minerals and a UV light source for killing pathogens existing in a liquid. A liquid is introduced into the device via the inlet. The liquid passes through the filter into a collector. The filtered liquid flows from the collector through a passage into a UV chamber. The UV light source emits UV rays through a UV transmissive wall into the interior portion of the UV chamber. Exposure to the UV light kills pathogens present in the filtered liquid. Substantially purified liquid can then be dispensed from an outlet.

1 Claim, 3 Drawing Sheets

U.S. PATENT DOCUMENTS

| | | | | |
|---|---|---|---|---|
| 2,761,832 A * | 9/1956 | Ward et al. | 210/85 |
| 3,220,555 A * | 11/1965 | Silha | 210/282 |
| 3,335,917 A * | 8/1967 | Knight | 222/189.07 |
| 3,339,743 A * | 9/1967 | Bealle | 210/256 |
| 3,392,837 A * | 7/1968 | Sanzenbacher | 210/282 |
| 3,430,769 A * | 3/1969 | Sanzenbacher | 210/266 |
| 3,536,197 A * | 10/1970 | Ward | 210/120 |
| 3,631,793 A * | 1/1972 | Bednartz | 99/295 |
| 3,715,035 A * | 2/1973 | Teeple, Jr. et al. | 210/249 |
| 3,747,767 A * | 7/1973 | Hankammer | 210/282 |
| 3,785,497 A * | 1/1974 | Giffard | 210/282 |
| 3,823,824 A * | 7/1974 | Close | 210/86 |
| 3,923,662 A * | 12/1975 | O'Brien | 210/251 |
| 3,950,253 A * | 4/1976 | Stern | 210/282 |
| 3,956,132 A * | 5/1976 | Takemitsu | 210/219 |
| 4,024,991 A * | 5/1977 | Tyson et al. | 222/190 |
| 4,066,551 A * | 1/1978 | Stern | 210/282 |
| D249,275 S * | 9/1978 | Mackay et al. | D23/209 |
| 4,149,454 A * | 4/1979 | Kemp | 99/295 |
| 4,151,085 A * | 4/1979 | Malik | 210/101 |
| 4,151,092 A * | 4/1979 | Grimm et al. | 210/256 |
| 4,181,243 A * | 1/1980 | Frahm | 222/189.06 |
| 4,283,283 A * | 8/1981 | Zimmerman | 210/282 |
| 4,306,971 A * | 12/1981 | Hankammer | 210/282 |
| 4,389,311 A * | 6/1983 | La Freniere | 210/198.1 |
| 4,419,235 A * | 12/1983 | Sway | 210/282 |
| 4,505,727 A * | 3/1985 | Cullen et al. | 96/147 |
| 4,528,095 A * | 7/1985 | Byrne | 210/206 |
| D283,044 S * | 3/1986 | Jack | D23/209 |
| 4,578,187 A * | 3/1986 | Alhauser | 210/93 |
| 4,605,499 A * | 8/1986 | Wise | 210/282 |
| 4,623,457 A * | 11/1986 | Hankammer | 210/237 |
| 4,666,600 A * | 5/1987 | Hankammer | 210/266 |
| 4,684,471 A * | 8/1987 | Manojlovic | 210/665 |
| 4,692,246 A * | 9/1987 | Simon | 210/232 |
| D295,888 S * | 5/1988 | Schulein et al. | D23/207 |
| 4,749,481 A * | 6/1988 | Wheatley | 210/282 |
| 4,749,484 A * | 6/1988 | Greenhut | 210/266 |
| 4,762,613 A * | 8/1988 | Snowball | 210/192 |
| 4,764,274 A * | 8/1988 | Miller | 210/232 |
| 4,767,016 A * | 8/1988 | Cook et al. | 215/230 |
| 4,776,956 A * | 10/1988 | Gannaway | 210/282 |
| 4,800,018 A * | 1/1989 | Moser | 210/266 |
| 4,828,692 A * | 5/1989 | Peranio | 210/123 |
| 4,834,267 A * | 5/1989 | Schroer et al. | 222/185.1 |
| 4,880,535 A * | 11/1989 | Burrows | 210/181 |
| 4,885,089 A * | 12/1989 | Hankammer | 210/420 |
| 4,895,648 A * | 1/1990 | Hankammer | 210/188 |
| 4,902,411 A * | 2/1990 | Lin | 210/104 |
| 4,936,984 A * | 6/1990 | Blandford et al. | 210/250 |
| 4,946,600 A * | 8/1990 | Shin | 210/758 |
| 4,948,499 A * | 8/1990 | Peranio | 210/180 |
| 4,969,996 A * | 11/1990 | Hankammer | 210/282 |
| D312,863 S * | 12/1990 | Hankammer | D23/209 |
| 4,990,254 A * | 2/1991 | Toida et al. | 210/464 |
| 4,995,975 A * | 2/1991 | Jacquot et al. | 210/266 |
| 4,998,228 A * | 3/1991 | Eger et al. | 368/10 |
| 5,002,665 A * | 3/1991 | Brueggemann | 210/266 |
| 5,049,272 A * | 9/1991 | Nieweg | 210/266 |
| D320,640 S * | 10/1991 | Goodwin | D23/209 |
| 5,076,922 A * | 12/1991 | DeAre | 210/282 |
| D323,874 S * | 2/1992 | Hirman et al. | D23/209 |
| D325,768 S * | 4/1992 | Hankammer | D23/212 |
| 5,122,272 A * | 6/1992 | Iana et al. | 210/473 |
| 5,128,036 A * | 7/1992 | Svensson | 210/264 |
| 5,139,666 A * | 8/1992 | Charbonneau et al. | 210/264 |
| D331,446 S * | 12/1992 | Gidman | D23/209 |
| D332,028 S * | 12/1992 | Melamed et al. | 7/317 |
| 5,167,819 A * | 12/1992 | Iana et al. | 210/474 |
| 5,173,192 A * | 12/1992 | Shalev | 210/767 |
| 5,190,643 A * | 3/1993 | Duncan et al. | 210/85 |
| 5,200,070 A * | 4/1993 | McMenamin | 210/266 |
| D336,011 S * | 6/1993 | Bannigan | D7/400 |
| D336,760 S * | 6/1993 | Raunkjaer | D23/209 |
| D337,691 S * | 7/1993 | Raunkjaer | D7/317 |
| 5,225,078 A * | 7/1993 | Polasky et al. | 210/264 |
| 5,238,559 A * | 8/1993 | Nieweg | 210/264 |
| 5,238,576 A * | 8/1993 | Affonso | 210/684 |
| 5,240,620 A * | 8/1993 | Shalev | 210/767 |
| 5,290,442 A * | 3/1994 | Clack | 210/257.1 |
| 5,308,482 A * | 5/1994 | Mead | 210/207 |
| 5,310,088 A * | 5/1994 | Burrows | 222/67 |
| 5,318,703 A * | 6/1994 | Heiligman | 210/264 |
| 5,322,625 A * | 6/1994 | Rise | 210/238 |
| 5,328,597 A * | 7/1994 | Boldt et al. | 210/87 |
| 5,370,041 A * | 12/1994 | Lowe | 99/286 |
| D354,795 S * | 1/1995 | Heligman | D23/209 |
| 5,393,419 A * | 2/1995 | Tiede et al. | 210/192 |
| 5,393,548 A * | 2/1995 | Heiligman | 426/433 |
| 5,411,661 A * | 5/1995 | Heiligman | 210/264 |
| 5,415,774 A * | 5/1995 | Cowan et al. | 210/266 |
| 5,417,860 A * | 5/1995 | Kay | 210/472 |
| 5,441,179 A * | 8/1995 | Marsh | 222/190 |
| 5,445,729 A * | 8/1995 | Monroe et al. | 210/86 |
| 5,449,093 A * | 9/1995 | Burrows | 222/146.1 |
| D363,760 S * | 10/1995 | Morem et al. | D23/209 |
| 5,454,944 A * | 10/1995 | Clack | 210/257.1 |
| D365,140 S * | 12/1995 | Raunkjaer | D23/209 |
| 5,486,285 A * | 1/1996 | Feeney | 210/85 |
| 5,505,120 A * | 4/1996 | Albertson | 99/286 |
| D370,051 S * | 5/1996 | Samson et al. | D23/209 |
| D370,711 S * | 6/1996 | Serenko et al. | D23/209 |
| 5,536,394 A * | 7/1996 | Lund et al. | 210/87 |
| 5,536,395 A * | 7/1996 | Kuennen et al. | 210/87 |
| 5,536,396 A * | 7/1996 | Mudra et al. | 210/94 |
| 5,540,848 A * | 7/1996 | Engelhard | 210/748.11 |
| D374,911 S * | 10/1996 | Kahana | D23/209 |
| 5,562,824 A * | 10/1996 | Magnusson | 210/266 |
| 5,567,308 A * | 10/1996 | Visser | 210/232 |
| 5,597,482 A * | 1/1997 | Melyon | 210/209 |
| 5,616,242 A * | 4/1997 | Mandola | 210/238 |
| 5,616,243 A * | 4/1997 | Levy | 210/282 |
| 5,628,895 A * | 5/1997 | Zucholl | 210/85 |
| 5,628,897 A * | 5/1997 | Phelan | 210/94 |
| 5,637,214 A * | 6/1997 | Kahana | 210/282 |
| 5,652,008 A * | 7/1997 | Heiligman | 426/422 |
| D383,638 S * | 9/1997 | Joergensen | D7/319 |
| 5,665,224 A * | 9/1997 | Levene et al. | 210/85 |
| D386,041 S * | 11/1997 | Tanner et al. | D7/319 |
| D386,351 S * | 11/1997 | Joergensen | D7/319 |
| D388,154 S * | 12/1997 | Pesa | D23/209 |
| 5,698,091 A * | 12/1997 | Kuennen et al. | 210/87 |
| D388,655 S * | 1/1998 | Flom et al. | D7/319 |
| D389,004 S * | 1/1998 | Hampshire et al. | D7/319 |
| 5,730,863 A * | 3/1998 | Howlings et al. | 210/109 |
| 5,785,844 A * | 7/1998 | Lund et al. | 210/85 |
| D398,184 S * | 9/1998 | Silverberg et al. | D7/319 |
| 5,811,004 A * | 9/1998 | Robertson et al. | 210/482 |
| D400,392 S * | 11/1998 | Robertson et al. | D7/319 |
| 5,830,360 A * | 11/1998 | Mozayeni | 210/651 |
| 5,843,309 A * | 12/1998 | Mancil | 210/205 |
| 5,846,418 A * | 12/1998 | Thompson et al. | 210/266 |
| 5,855,160 A * | 1/1999 | Shen | 99/279 |
| D406,003 S * | 2/1999 | Tanner et al. | D7/319 |
| 5,873,995 A * | 2/1999 | Huang et al. | 210/87 |
| 5,882,507 A * | 3/1999 | Tanner et al. | 210/85 |
| 5,900,138 A * | 5/1999 | Moretto | 210/85 |
| 5,900,143 A * | 5/1999 | Dalton et al. | 210/192 |
| 5,900,212 A * | 5/1999 | Maiden et al. | 422/24 |
| 5,914,045 A * | 6/1999 | Palmer et al. | 210/694 |
| 5,922,378 A * | 7/1999 | Kagan et al. | 426/132 |
| 5,927,180 A * | 7/1999 | Russo | 99/322 |
| 5,928,506 A * | 7/1999 | Bae | 210/94 |
| 5,928,512 A * | 7/1999 | Hatch et al. | 210/266 |
| D415,922 S * | 11/1999 | Kawasaki et al. | D7/317 |
| 5,980,743 A * | 11/1999 | Bairischer | 210/266 |
| 5,989,424 A * | 11/1999 | Serenko et al. | 210/266 |
| D419,027 S * | 1/2000 | Haslem et al. | D7/319 |
| 6,012,232 A * | 1/2000 | Weyrauch | 34/61 |
| 6,013,180 A * | 1/2000 | Wang | 210/232 |
| D421,361 S * | 3/2000 | Coulson et al. | D7/319 |
| 6,042,720 A * | 3/2000 | Reber et al. | 210/85 |
| 6,042,725 A * | 3/2000 | Serenko et al. | 210/266 |
| 6,053,482 A * | 4/2000 | Glenn et al. | 261/4 |
| 6,074,550 A * | 6/2000 | Hofmann et al. | 210/87 |
| 6,099,728 A * | 8/2000 | Bairischer | 210/266 |
| 6,103,114 A * | 8/2000 | Tanner et al. | 210/232 |

| | | | | | | | | |
|---|---|---|---|---|---|---|---|---|
| 6,110,424 | A | * | 8/2000 | Maiden et al. | 210/748.11 | 6,953,523 B2 * | 10/2005 | Vandenbelt et al. ............ 210/85 |
| 6,120,691 | A | * | 9/2000 | Mancil | 210/748.11 | 6,953,604 B2 * | 10/2005 | Koslow ...................... 427/244 |
| 6,129,841 | A | * | 10/2000 | Dann | 210/255 | 6,959,820 B2 * | 11/2005 | Koslow ...................... 210/489 |
| D435,084 | S | * | 12/2000 | Northen et al. | D23/209 | 6,960,295 B2 * | 11/2005 | Chaouachi et al. .......... 210/232 |
| 6,159,363 | A | * | 12/2000 | Collins et al. | 210/136 | 6,994,879 B2 * | 2/2006 | Cirigliano et al. ........... 426/433 |
| 6,174,066 | B1 | * | 1/2001 | Vinding-Diers | 362/96 | 6,998,058 B2 * | 2/2006 | Koslow ...................... 210/764 |
| 6,178,290 | B1 | * | 1/2001 | Weyrauch et al. | 392/445 | 7,002,140 B2 * | 2/2006 | Elsegood et al. ............. 250/251 |
| 6,180,003 | B1 | * | 1/2001 | Reber et al. | 210/198.1 | 7,008,537 B2 * | 3/2006 | Koslow ..................... 210/257.2 |
| 6,193,894 | B1 | * | 2/2001 | Hollander | 210/748.11 | 7,011,753 B2 * | 3/2006 | Koslow ...................... 210/263 |
| 6,202,541 | B1 | * | 3/2001 | Cai | 99/286 | 7,014,759 B2 * | 3/2006 | Radford ..................... 210/232 |
| D440,110 | S | * | 4/2001 | Tanner et al. | D7/319 | 7,081,225 B1 * | 7/2006 | Hollander ................ 210/748.11 |
| 6,224,751 | B1 | * | 5/2001 | Hofmann et al. | 210/85 | D529,127 S * | 9/2006 | Cueman ..................... D23/209 |
| 6,227,382 | B1 | * | 5/2001 | Cutler et al. | 210/473 | 7,107,838 B2 * | 9/2006 | Chai et al. ................... 73/304 R |
| 6,238,552 | B1 | * | 5/2001 | Shannon | 210/94 | 7,138,054 B2 * | 11/2006 | Harms et al. .................. 264/49 |
| 6,248,244 | B1 | * | 6/2001 | Dann | 210/764 | 7,144,533 B2 * | 12/2006 | Koslow ....................... 264/49 |
| D444,987 | S | * | 7/2001 | McGrath et al. | D7/319 | 7,153,424 B2 * | 12/2006 | Aalto et al. ................. 210/321.6 |
| 6,254,768 | B1 | * | 7/2001 | Dulieu et al. | 210/91 | 7,166,216 B2 * | 1/2007 | Woodard et al. ............. 210/232 |
| 6,287,456 | B1 | * | 9/2001 | Fish et al. | 210/85 | 7,175,760 B2 * | 2/2007 | Cary et al. .................... 210/123 |
| 6,290,848 | B1 | * | 9/2001 | Tanner et al. | 210/266 | 7,201,840 B2 * | 4/2007 | Tsataros et al. ................ 210/85 |
| D452,296 | S | * | 12/2001 | Egnell et al. | D23/209 | 7,232,517 B1 * | 6/2007 | Shepherd ..................... 210/94 |
| 6,354,344 | B1 | * | 3/2002 | Pluta et al. | 141/192 | D546,113 S * | 7/2007 | Ruoff .......................... D7/319 |
| 6,361,686 | B1 | * | 3/2002 | Conrad | 210/192 | 7,250,619 B2 * | 7/2007 | Taylor et al. ................ 250/504 R |
| 6,370,884 | B1 | * | 4/2002 | Kelada | 62/3.64 | 7,252,763 B2 * | 8/2007 | Kuennen et al. ............... 210/192 |
| 6,383,381 | B1 | * | 5/2002 | O'Flynn et al. | 210/232 | 7,294,266 B2 * | 11/2007 | Vetterli ........................ 210/282 |
| 6,387,260 | B1 | * | 5/2002 | Pimenov et al. | 210/222 | 7,294,277 B2 * | 11/2007 | Moretto ....................... 210/746 |
| 6,405,875 | B1 | * | 6/2002 | Cutler | 210/477 | 7,297,283 B2 * | 11/2007 | Ali ............................. 210/767 |
| 6,419,821 | B1 | * | 7/2002 | Gadgil et al. | 210/86 | 7,306,723 B2 * | 12/2007 | Radford ...................... 210/232 |
| 6,423,224 | B1 | * | 7/2002 | Tanner et al. | 210/247 | 7,309,418 B2 * | 12/2007 | Joyce et al. .................... 210/95 |
| 6,428,687 | B1 | * | 8/2002 | Moretto | 210/100 | 7,311,828 B2 * | 12/2007 | Miles et al. ................... 210/232 |
| 6,436,299 | B1 | * | 8/2002 | Baarman et al. | 210/748.09 | 7,311,829 B2 * | 12/2007 | Roffman et al. .............. 210/265 |
| 6,440,302 | B1 | * | 8/2002 | Leipziger | 210/223 | D558,516 S * | 1/2008 | Bulala et al. .................. D7/400 |
| 6,451,202 | B1 | * | 9/2002 | Kuennen et al. | 210/136 | D562,430 S * | 2/2008 | Slawomir .................... D23/209 |
| 6,454,941 | B1 | * | 9/2002 | Cutler et al. | 210/266 | D565,149 S * | 3/2008 | Slawomir .................... D23/209 |
| D465,377 | S | * | 11/2002 | Murison et al. | D7/319 | D565,694 S * | 4/2008 | Slawomir .................... D23/209 |
| 6,475,352 | B2 | * | 11/2002 | Conrad | 204/176 | D566,808 S * | 4/2008 | Slawomir .................... D23/209 |
| 6,478,956 | B2 | * | 11/2002 | Kaura | 210/232 | 7,361,904 B2 * | 4/2008 | Cassassuce et al. ........... 250/436 |
| 6,485,644 | B2 | * | 11/2002 | Bowler | 210/282 | D568,666 S * | 5/2008 | Souloglou ................... D7/317 |
| 6,491,811 | B2 | * | 12/2002 | Conrad et al. | 210/85 | 7,378,015 B2 * | 5/2008 | Rinker et al. ................. 210/203 |
| 6,491,868 | B2 | * | 12/2002 | Kuennen et al. | 422/24 | 7,387,729 B2 * | 6/2008 | Vandenbelt et al. ........... 210/284 |
| 6,491,879 | B2 | * | 12/2002 | Conrad | 422/186.18 | D573,394 S * | 7/2008 | Tullney et al. ................ D7/317 |
| 6,514,405 | B1 | * | 2/2003 | Lifschitz | 210/143 | D573,395 S * | 7/2008 | Tullney et al. ................ D7/317 |
| 6,514,420 | B2 | * | 2/2003 | Kuennen et al. | 210/748.11 | 7,396,459 B2 * | 7/2008 | Thorpe ........................ 210/205 |
| 6,524,477 | B1 | * | 2/2003 | Hughes | 210/282 | 7,396,461 B2 * | 7/2008 | Bommi et al. ................ 210/266 |
| 6,533,930 | B1 | * | 3/2003 | Kool et al. | 210/198.1 | 7,413,653 B2 * | 8/2008 | Powell ....................... 210/416.3 |
| D473,750 | S | * | 4/2003 | Murison et al. | D7/397 | 7,427,355 B2 * | 9/2008 | Chau .......................... 210/266 |
| 6,550,622 | B2 | * | 4/2003 | Koslow | 210/490 | D579,515 S * | 10/2008 | Bell et al. .................... D23/209 |
| 6,561,234 | B2 | * | 5/2003 | Pluta et al. | 141/95 | 7,438,799 B2 * | 10/2008 | Vandenbelt et al. ............ 210/85 |
| 6,569,319 | B2 | * | 5/2003 | Kuennen et al. | 210/85 | 7,441,665 B2 * | 10/2008 | Bridges et al. ............... 210/474 |
| 6,574,984 | B1 | * | 6/2003 | McCrea et al. | 62/449 | 7,470,364 B2 * | 12/2008 | Oranski et al. ............. 210/198.1 |
| 6,579,495 | B1 | * | 6/2003 | Maiden | 210/748.11 | D585,231 S * | 1/2009 | Bulala et al. ................. D7/319 |
| 6,599,427 | B2 | * | 7/2003 | Nohren et al. | 210/660 | 7,476,312 B2 * | 1/2009 | Laing et al. .................. 210/109 |
| 6,602,406 | B1 | * | 8/2003 | Nohren et al. | 210/136 | 7,487,677 B2 * | 2/2009 | Chai et al. ................... 73/304 R |
| 6,602,425 | B2 | * | 8/2003 | Gadgil et al. | 210/744 | 7,507,338 B2 * | 3/2009 | Bommi et al. ................ 210/232 |
| 6,638,426 | B1 | * | 10/2003 | Fritter et al. | 210/266 | 7,510,088 B2 * | 3/2009 | Smith et al. .................. 210/456 |
| 6,649,045 | B2 | * | 11/2003 | Tanner et al. | 210/85 | D590,475 S * | 4/2009 | Bell et al. .................... D23/209 |
| 6,651,824 | B2 | * | 11/2003 | Miller | 210/464 | 7,513,278 B2 * | 4/2009 | Hengsperger et al. ........... 141/85 |
| 6,673,250 | B2 | * | 1/2004 | Kuennen et al. | 210/748.11 | D600,498 S * | 9/2009 | Ma et al. ..................... D7/397 |
| 6,716,343 | B2 | * | 4/2004 | Kool et al. | 210/175 | 7,615,152 B2 * | 11/2009 | Tanner et al. ............... 210/257.1 |
| 6,716,345 | B2 | * | 4/2004 | Snyder | 210/198.1 | 7,632,397 B2 * | 12/2009 | Bathula ........................ 210/86 |
| 6,726,839 | B2 | * | 4/2004 | Taylor, Jr. | 210/198.1 | 7,645,381 B2 * | 1/2010 | Oranski et al. ............. 210/198.1 |
| 6,767,453 | B2 | * | 7/2004 | Lifschitz | 210/85 | D612,906 S * | 3/2010 | Reid et al. ................... D23/209 |
| 6,773,587 | B2 | * | 8/2004 | Kool et al. | 210/232 | 7,670,479 B2 * | 3/2010 | Arett et al. .................... 210/85 |
| 6,773,608 | B1 | * | 8/2004 | Hallett et al. | 210/748.11 | 7,678,282 B2 * | 3/2010 | Moretto ....................... 210/746 |
| D496,429 | S | * | 9/2004 | Donnelly | D23/209 | D614,259 S * | 4/2010 | Reid et al. ................... D23/209 |
| 6,793,817 | B2 | * | 9/2004 | Kuennen et al. | 210/232 | 7,695,615 B2 * | 4/2010 | Vinogradova et al. ......... 210/120 |
| 6,797,167 | B2 | * | 9/2004 | Koslow | 210/493.1 | 7,703,382 B2 * | 4/2010 | Oranski et al. .................. 99/295 |
| D497,195 | S | * | 10/2004 | Nishi et al. | D23/209 | D615,149 S * | 5/2010 | Reid et al. ................... D23/209 |
| 6,811,691 | B2 | * | 11/2004 | Woodard et al. | 210/232 | D615,150 S * | 5/2010 | Reid et al. ................... D23/209 |
| 6,835,311 | B2 | * | 12/2004 | Koslow | 210/490 | 7,708,958 B2 * | 5/2010 | Namespetra et al. .......... 422/300 |
| D500,836 | S | * | 1/2005 | Nishi et al. | D23/209 | 7,713,336 B2 * | 5/2010 | Hengsperger et al. ........ 96/117.5 |
| 6,841,067 | B1 | * | 1/2005 | Hofmann et al. | 210/266 | 7,713,482 B2 * | 5/2010 | Rinker et al. ................. 422/430 |
| D501,755 | S | * | 2/2005 | Namur | D7/397 | 7,713,496 B2 * | 5/2010 | Harris ........................ 422/186.3 |
| D501,912 | S | * | 2/2005 | Tanner et al. | D23/209 | D617,869 S * | 6/2010 | Reid et al. ................... D23/209 |
| 6,860,992 | B2 | * | 3/2005 | Chau | 210/251 | D618,761 S * | 6/2010 | Reid et al. ................... D23/209 |
| 6,861,652 | B2 | * | 3/2005 | Wismeth | 250/455.11 | 7,754,090 B1 * | 7/2010 | Berg ........................ 210/748.01 |
| 6,881,327 | B2 | * | 4/2005 | Tanner et al. | 210/85 | 7,767,087 B2 * | 8/2010 | Wilson ........................ 210/249 |
| 6,913,154 | B2 | * | 7/2005 | Koslow | 210/489 | D623,465 S * | 9/2010 | Sheppard et al. ............. D7/318 |
| 6,948,666 | B1 | * | 9/2005 | Leadlay | 239/575 | 7,807,052 B2 * | 10/2010 | Milne ......................... 210/122 |
| 6,949,185 | B2 | * | 9/2005 | Woodard et al. | 210/198.1 | 7,828,969 B2 * | 11/2010 | Eaton et al. .................. 210/263 |

| | | | |
|---|---|---|---|
| 7,837,865 B2 * | 11/2010 | Wadstrom | 210/85 |
| 7,850,859 B2 * | 12/2010 | Tanner et al. | 210/767 |
| D630,894 S * | 1/2011 | Harris et al. | D7/397 |
| D630,895 S * | 1/2011 | Sheppard et al. | D7/397 |
| D630,896 S * | 1/2011 | Sheppard et al. | D7/397 |
| 7,862,720 B2 * | 1/2011 | Brown | 210/335 |
| 7,883,619 B2 * | 2/2011 | Vecziedins et al. | 210/85 |
| D633,595 S * | 3/2011 | Reid et al. | D23/209 |
| 7,906,019 B2 * | 3/2011 | Elliott et al. | 210/205 |
| D638,246 S * | 5/2011 | Harris et al. | D7/316 |
| D639,102 S * | 6/2011 | Harris et al. | D7/319 |
| D640,346 S * | 6/2011 | Sheppard et al. | D23/209 |
| D640,769 S * | 6/2011 | Sheppard et al. | D23/209 |
| D640,770 S * | 6/2011 | Sheppard et al. | D23/209 |
| 7,955,501 B2 * | 6/2011 | Wilson | 210/120 |
| 7,959,872 B2 * | 6/2011 | Namespetra et al. | 422/300 |
| 7,987,769 B2 * | 8/2011 | Oranski et al. | 99/295 |
| D647,594 S * | 10/2011 | Bridges et al. | D23/209 |
| 8,043,502 B2 * | 10/2011 | Nauta | 210/232 |
| 2001/0006162 A1 * | 7/2001 | Hollander | 210/748 |
| 2001/0032822 A1 * | 10/2001 | Koslow et al. | 210/767 |
| 2002/0005377 A1 * | 1/2002 | Tanner et al. | 210/226 |
| 2002/0011434 A1 * | 1/2002 | Kuennen et al. | 210/97 |
| 2002/0014461 A1 * | 2/2002 | Kuennen et al. | 210/739 |
| 2002/0020673 A1 * | 2/2002 | Nohren et al. | 210/660 |
| 2002/0060175 A1 * | 5/2002 | Conrad et al. | 210/85 |
| 2002/0060176 A1 * | 5/2002 | Mierau et al. | 210/94 |
| 2002/0060177 A1 * | 5/2002 | Conrad | 210/203 |
| 2002/0060189 A1 * | 5/2002 | Conrad | 210/739 |
| 2002/0060190 A1 * | 5/2002 | Conrad | 210/739 |
| 2002/0061265 A1 * | 5/2002 | Conrad | 422/186.07 |
| 2002/0066698 A1 * | 6/2002 | Brunner | 210/474 |
| 2002/0070153 A1 * | 6/2002 | Bowler | 210/245 |
| 2002/0083841 A1 * | 7/2002 | Chaouachi et al. | 99/279 |
| 2002/0092813 A1 * | 7/2002 | Radford | 210/767 |
| 2002/0113022 A1 * | 8/2002 | Gadgil et al. | 210/748 |
| 2002/0117442 A1 * | 8/2002 | Kaura | 210/474 |
| 2002/0125187 A1 * | 9/2002 | Tanner et al. | 210/418 |
| 2002/0131906 A1 * | 9/2002 | Wismeth | 422/186 |
| 2002/0134715 A1 * | 9/2002 | Tanner et al. | 210/85 |
| 2002/0139746 A1 * | 10/2002 | Koslow | 210/493.1 |
| 2002/0162779 A1 * | 11/2002 | Kuennen et al. | 210/109 |
| 2002/0170618 A1 * | 11/2002 | Pluta et al. | 141/95 |
| 2002/0189986 A1 * | 12/2002 | Kuennen et al. | 210/109 |
| 2003/0000878 A1 * | 1/2003 | Woodard et al. | 210/175 |
| 2003/0000879 A1 * | 1/2003 | Snyder | 210/175 |
| 2003/0000880 A1 * | 1/2003 | Kool et al. | 210/175 |
| 2003/0006180 A1 * | 1/2003 | Taylor, Jr. | 210/175 |
| 2003/0010695 A1 * | 1/2003 | Kool et al. | 210/192 |
| 2003/0019803 A1 * | 1/2003 | Woodard et al. | 210/175 |
| 2003/0034291 A1 * | 2/2003 | Miller | 210/244 |
| 2003/0075490 A1 * | 4/2003 | Lifschitz | 210/192 |
| 2003/0085169 A1 * | 5/2003 | Reid | 210/435 |
| 2003/0111404 A1 * | 6/2003 | Koslow | 210/483 |
| 2003/0159979 A1 * | 8/2003 | Chau | 210/282 |
| 2003/0168401 A1 * | 9/2003 | Koslow | 210/500.25 |
| 2003/0196963 A1 * | 10/2003 | Koslow | 210/681 |
| 2003/0196964 A1 * | 10/2003 | Koslow | 210/681 |
| 2003/0201231 A1 * | 10/2003 | Koslow | 210/660 |
| 2003/0205529 A1 * | 11/2003 | Koslow | 210/660 |
| 2003/0205530 A1 * | 11/2003 | Koslow | 210/660 |
| 2003/0205531 A1 * | 11/2003 | Koslow | 210/660 |
| 2003/0213750 A1 * | 11/2003 | Koslow | 210/660 |
| 2004/0011721 A1 * | 1/2004 | Aalto et al. | 210/321.6 |
| 2004/0060873 A1 * | 4/2004 | Yanou et al. | 210/660 |
| 2004/0129617 A1 * | 7/2004 | Tanner et al. | 210/85 |
| 2004/0134932 A1 * | 7/2004 | Lobdell | 222/146.5 |
| 2004/0149642 A1 * | 8/2004 | Vandenbelt et al. | 210/282 |
| 2004/0149643 A1 * | 8/2004 | Vandenbelt et al. | 210/282 |
| 2004/0168957 A1 * | 9/2004 | Tsataros et al. | 210/85 |
| 2004/0173507 A1 * | 9/2004 | Tanner et al. | 210/85 |
| 2004/0182761 A1 * | 9/2004 | Kuennen et al. | 210/136 |
| 2005/0072729 A1 * | 4/2005 | Bridges et al. | 210/469 |
| 2005/0077732 A1 * | 4/2005 | Baarman et al. | 290/54 |
| 2005/0109683 A1 * | 5/2005 | Joyce et al. | 210/94 |
| 2005/0109690 A1 * | 5/2005 | Bechtold | 210/239 |
| 2005/0133420 A1 * | 6/2005 | Rinker et al. | 210/143 |
| 2005/0133427 A1 * | 6/2005 | Rinker et al. | 210/209 |
| 2005/0139540 A1 * | 6/2005 | Mierau et al. | 210/435 |
| 2005/0167611 A1 * | 8/2005 | Elsegood et al. | 250/435 |
| 2005/0224422 A1 * | 10/2005 | Moretto | 210/746 |
| 2005/0229700 A1 * | 10/2005 | Chai et al. | 73/304 R |
| 2005/0247609 A1 * | 11/2005 | Laing et al. | 210/109 |
| 2005/0252844 A1 * | 11/2005 | Chau | 210/282 |
| 2005/0279689 A1 * | 12/2005 | Oranski et al. | 210/198.1 |
| 2006/0000763 A1 * | 1/2006 | Rinker et al. | 210/282 |
| 2006/0021926 A1 * | 2/2006 | Woodard et al. | 210/232 |
| 2006/0113258 A1 * | 6/2006 | Radford | 210/767 |
| 2006/0157399 A1 * | 7/2006 | Vandenbelt et al. | 210/282 |
| 2006/0162806 A1 * | 7/2006 | Hengsperger et al. | 141/18 |
| 2006/0163148 A1 * | 7/2006 | Hengsperger et al. | 210/473 |
| 2006/0163169 A1 * | 7/2006 | Eckhardt et al. | 210/748 |
| 2006/0163174 A1 * | 7/2006 | Namespetra et al. | 210/760 |
| 2006/0191824 A1 * | 8/2006 | Arett et al. | 210/85 |
| 2006/0226064 A1 * | 10/2006 | Beckman et al. | 210/323.1 |
| 2006/0231476 A1 * | 10/2006 | Vandenbelt et al. | 210/266 |
| 2006/0249442 A1 * | 11/2006 | Yap et al. | 210/470 |
| 2006/0260990 A1 * | 11/2006 | Joyce et al. | 210/85 |
| 2007/0045169 A1 * | 3/2007 | Powell | 210/416.3 |
| 2007/0108136 A1 * | 5/2007 | Gold | 210/767 |
| 2007/0125713 A1 * | 6/2007 | Harris | 210/663 |
| 2007/0131617 A1 * | 6/2007 | Ali | 210/660 |
| 2007/0187315 A1 * | 8/2007 | Vinogradova et al. | 210/232 |
| 2007/0209984 A1 * | 9/2007 | Lev et al. | 210/143 |
| 2007/0215536 A1 * | 9/2007 | Bommi et al. | 210/282 |
| 2007/0221561 A1 * | 9/2007 | Funkhouser et al. | 210/232 |
| 2007/0262010 A1 * | 11/2007 | Wadstrom | 210/175 |
| 2007/0278141 A1 * | 12/2007 | Patera et al. | 210/110 |
| 2008/0011670 A1 * | 1/2008 | Smith et al. | 210/456 |
| 2008/0023406 A1 * | 1/2008 | Rawson et al. | 210/688 |
| 2008/0035553 A1 * | 2/2008 | Brown | 210/335 |
| 2008/0035582 A1 * | 2/2008 | Moretto | 210/748 |
| 2008/0067414 A1 * | 3/2008 | Cassassuce et al. | 250/435 |
| 2008/0087596 A1 * | 4/2008 | Bommi et al. | 210/232 |
| 2008/0110820 A1 * | 5/2008 | Knipmeyer et al. | 210/474 |
| 2008/0116146 A1 * | 5/2008 | Herrington et al. | 210/748 |
| 2008/0190825 A1 * | 8/2008 | Hengsperger et al. | 210/95 |
| 2008/0190827 A1 * | 8/2008 | Rinker et al. | 210/101 |
| 2008/0202992 A1 * | 8/2008 | Bridges et al. | 210/85 |
| 2008/0202996 A1 * | 8/2008 | Oranski et al. | 210/143 |
| 2008/0314808 A1 * | 12/2008 | Vandenbelt et al. | 210/85 |
| 2009/0001011 A1 * | 1/2009 | Knipmeyer et al. | 210/266 |
| 2009/0039028 A1 * | 2/2009 | Eaton et al. | 210/679 |
| 2009/0039032 A1 * | 2/2009 | Patera et al. | 210/760 |
| 2009/0057220 A1 * | 3/2009 | Nauta | 210/282 |
| 2009/0057241 A1 * | 3/2009 | Nauta | 210/767 |
| 2009/0071890 A1 * | 3/2009 | Oranski et al. | 210/234 |
| 2009/0200215 A1 * | 8/2009 | Bathula | 210/85 |
| 2009/0202691 A1 * | 8/2009 | Gauger | 426/432 |
| 2009/0272682 A1 * | 11/2009 | Rinker et al. | 210/198.1 |
| 2009/0314703 A1 * | 12/2009 | Beach et al. | 210/232 |
| 2010/0006507 A1 * | 1/2010 | Tanner et al. | 210/662 |
| 2010/0006508 A1 * | 1/2010 | Mitchell et al. | 210/669 |
| 2010/0044291 A1 * | 2/2010 | Tseng | 210/230 |
| 2010/0065488 A1 * | 3/2010 | Milne | 210/242.1 |
| 2010/0068343 A1 * | 3/2010 | Johann et al. | 426/66 |
| 2010/0102002 A1 * | 4/2010 | O'Brien et al. | 210/668 |
| 2010/0133297 A1 * | 6/2010 | Arett et al. | 222/129 |
| 2010/0163470 A1 * | 7/2010 | Oranski et al. | 210/141 |
| 2010/0176037 A1 * | 7/2010 | Namespetra et al. | 210/85 |
| 2010/0215552 A1 * | 8/2010 | Wu | 422/186.3 |
| 2010/0243582 A1 * | 9/2010 | Riedel et al. | 210/767 |
| 2010/0243583 A1 * | 9/2010 | Riedel et al. | 210/767 |
| 2010/0314306 A1 * | 12/2010 | Wadstrom | 210/175 |
| 2011/0000841 A1 * | 1/2011 | Rusinov et al. | 210/282 |
| 2011/0056386 A1 * | 3/2011 | Taketani | 99/317 |
| 2011/0073551 A1 * | 3/2011 | Reid et al. | 210/800 |
| 2011/0084006 A1 * | 4/2011 | Wu | 210/85 |

* cited by examiner

UV LIQUID STORAGE AND DISPENSING DEVICE

FIELD

The present disclosure relates generally to a liquid storage and dispensing device for water and the like, such as a pitcher, and more particularly to a liquid storage and dispensing device that filters incoming water and treats it with UV light prior to dispensing.

BACKGROUND

Pitchers that employ interior gravity filters to remove certain naturally occurring minerals from water are known. Such filtration devices are typically capable of removing minerals such as chlorine and metals, thus leaving behind bacteria and other potential pathogens. Consequently, there exists a need for a device that can remove both minerals and pathogens from water prior to dispensing for drinking.

SUMMARY

A liquid storage and dispensing device has a liquid chamber positioned between an inlet and an outlet. The liquid chamber, inlet and outlet are in fluid communication with each other. The inlet receives incoming liquid and the outlet dispenses outgoing liquid. The liquid chamber has a filtration unit for filtering minerals from the incoming liquid. Downstream from the filtration unit is a UV light source that emits UV rays into the filtered liquid. All of the liquid entering the inlet passes through the filtration unit and is exposed to the emitted UV rays prior to being dispensed from the outlet. Exposure to the UV rays kills pathogens present in the liquid. Substantially purified liquid can then be dispensed from the outlet.

BRIEF DESCRIPTION OF THE DRAWINGS

In the accompanying drawing, like elements are numbered alike in the several Figures.

DETAILED DESCRIPTION

With reference to the drawings wherein like numerals represent like parts throughout the Figures, a liquid storage and dispensing device 10 is preferably a pitcher used to filter, store and dispense water for drinking, but is not limited as such. Embodiments of the liquid storage and dispensing device filter out minerals from and kill pathogens found in typical water sources, such as tap water, prior to dispensing for drinking.

Figure 1:
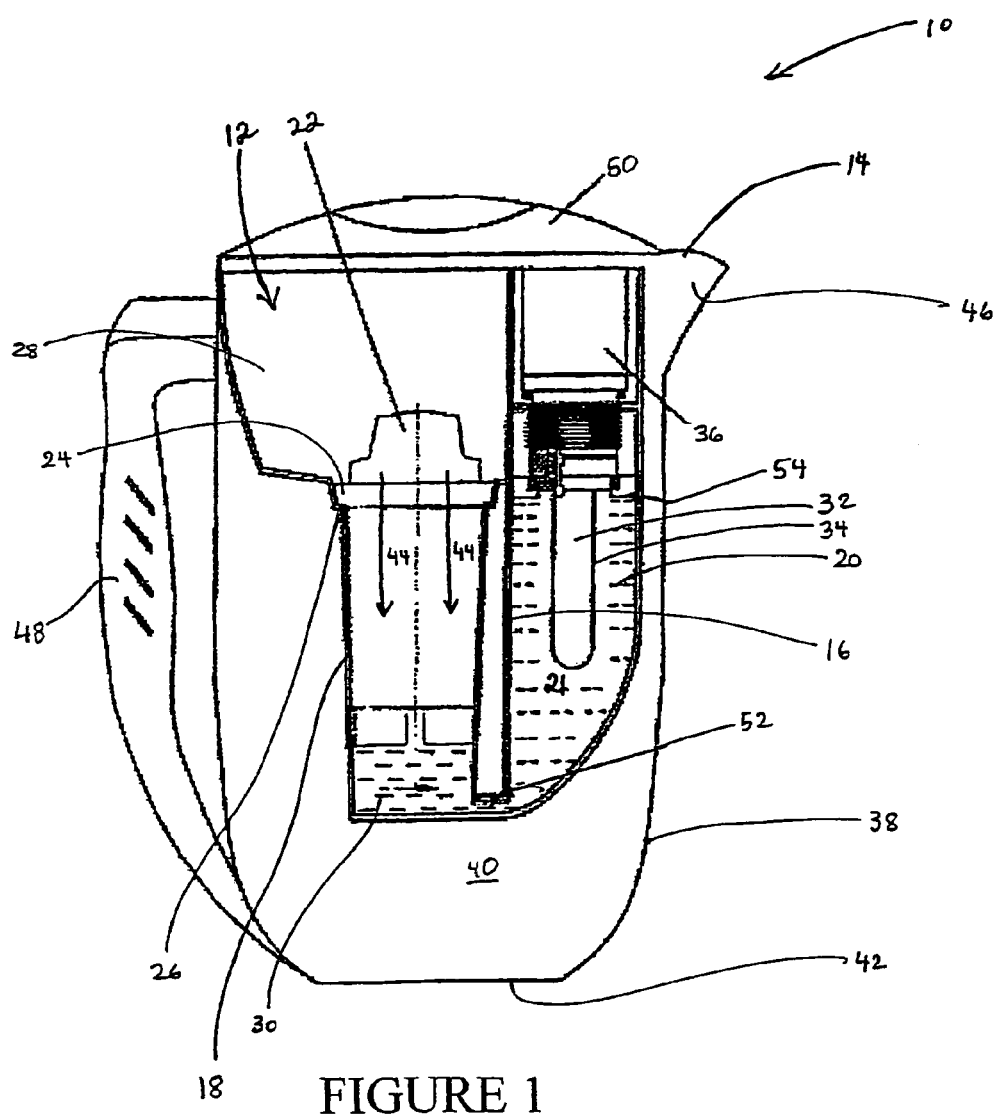
FIG. 1 is an axial section view, partly in schematic, of an embodiment of the liquid storage and dispensing device together with a liquid to further illustrate the operation of the device.

In the FIG. 1 embodiment, the device 10 has an inlet 12 and an outlet 14 separated by a liquid chamber 16. As can be seen, the inlet 12, outlet 14 and liquid chamber 16 are in fluid communication with each other. The liquid chamber 16 comprises a filtration compartment 18 and a UV compartment 20. In this embodiment, the filtration compartment 18 is upstream of the UV compartment 20, however the disclosure is not limited to this relative orientation.

Figure 2:
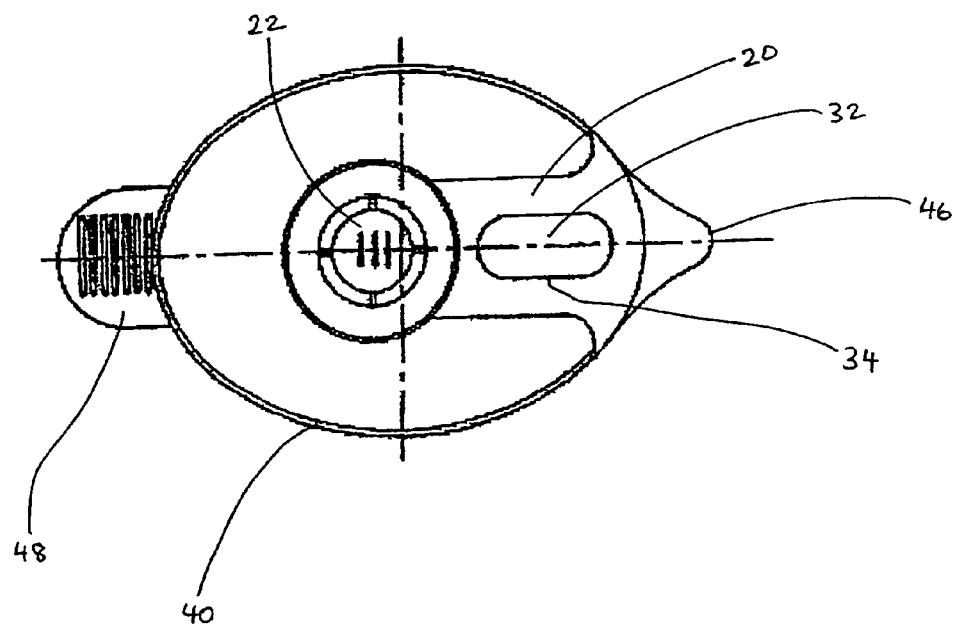
FIG. 2 is a simple plan view of the liquid storage and dispensing device of FIG. 1.

Disposed within the filtration compartment 18 is a filter 22. As shown in FIG. 2, the filter 22 of this embodiment has a circular cross section. The filter 22 also includes a radial extension 24. The filtration compartment 18 is fit with a corresponding radial notch 26 within which the filter radial extension 24 rests when the filter 22 is installed in the device. Preferably the filter is removable and replaceable. In this embodiment, the filter 22 can simply be lifted out from the filtration compartment 18. The same filter 22 or a new filter of like shape can be installed by positioning within the filtration compartment 18 with the radial extension 24 engaged with the radial notch 26. Consequently, a filter that loses effectiveness due to use over time can easily be replaced with a fresh filter. In this embodiment, when the filter 22 is installed, the filter 22 separates the filtration compartment into a reservoir 28 and a collector 30.

In this embodiment, the UV compartment has an elongated shape and a downwardly projecting hollow portion 32. Here, the hollow portion 32 is tubular in shape with a generally oval-shaped cross section. The hollow portion 32 has UV transmissive walls 34 and projects downward into the UV compartment 20. The hollow portion 32 is preferably located toward the axial center of the UV compartment 20.

Also disposed within the UV compartment is a UV light unit 36. The UV light unit 36 is positioned to emit UV rays through the UV transmissive walls 34 into the UV compartment interior portion 21. Preferably, the UV light unit 36 is removable and utilizes a rechargeable power source, such as a battery. In a preferred embodiment the UV light unit 36 emits ultraviolet-C waves or employs a UV-C bulb.

UV-C light exposure is known to kill pathogens such as bacteria and even viruses by penetrating the thin walls of the pathogens and altering their genetic structure, ultimately resulting in death. Some nonlimiting examples of such pathogens include those that cause influenza, strep throat, colds, staph infections and tuberculosis. UV-C light is also known to kill the *Escherichia coli* bacterium (*E. coli*), a bacterium commonly found in water supplies. Further, many UV-C light bulbs have long operating lives, equating to thousands of hours of use prior to replacement.

This embodiment also features a housing 38. The housing 38 comprises a body 40, a base 42, a spout 46 and a handle 48. A removable cover 50 can be placed on the top of the housing 38 to help prevent spillage or contamination of the device by outside particles.

In this embodiment, liquid such as tap water is introduced into the device 10 at the inlet 12. The liquid subsequently passes through the filter 22 via gravitational forces. The rate that liquid is introduced into the device 10 is generally greater than the rate of filtration through the filter 22. Consequently, the liquid builds up in the reservoir 28. As the liquid passes through the filter 22, minerals such as metals and chlorine are filtered out of the liquid and the filtered liquid enters the collector 30. The flow of liquid through the filter 22 is represented by arrows 44 in FIG. 1.

As the collector 30 fills up, and provided there is liquid in the reservoir, the filtered liquid will flow from the collector 30 through the passage 52 to the UV compartment 20. While in the UV compartment 20, the liquid is exposed to the UV rays emitted from the UV light unit 36. Exposure to the UV rays kills nearly all of the pathogens present in the filtered liquid. A user can then dispense substantially purified liquid from the outlet 14 by tipping the spout 46 downward.

Alternatively, prior to liquid building up in the collector 30 and while liquid is passing through the filter 22, a user can tip the spout end of the device 10 downward, affecting a flow of filtered liquid from the collector 30 through the passage 52 to the UV compartment 20 and out the outlet 14. As can be seen in FIG. 1, in this embodiment, the UV compartment 20 has an exit opening 54. The passage 52 and the exit opening 54 have relatively narrow diameters to control the liquid flow rate through the UV compartment. Each diameter is configured to slow the flow of liquid through the UV chamber. All of the liquid flowing through the UV chamber is exposed to the UV rays for a duration long enough to kill at least 99% of the pathogens present in the liquid.

Test Results

Two aqueous samples of *E. coli* were prepared and passed through a device such as that depicted in FIG. 1. The samples were subjected to (a) filtration alone; and (b) filtration followed by UV-C light exposure. The results are summarized in Table 1:

TABLE 1

| Original sample | Filter with UV lamp off | | Filter with UV lamp on | |
| --- | --- | --- | --- | --- |
| *E. coli* conc. (cfu/mL) | *E. coli* conc. (cfu/mL) | Reduction efficiency | *E. coli* conc. (cfu/mL) | Reduction efficiency |
| 270,000 | 210,000 | 22.2% | 440 | 99.8% |
| 350,000 | 220,000 | 37.1% | 1,100 | 99.7% |

As Table 1 shows, when the sample was subjected to both filtration and UV exposure in the device, the device was capable of reducing the concentration of *E. coli* by over 99%.

As noted above, the UV light unit 36 is preferably removable and rechargeable. One embodiment of the UV light unit 36 utilizes a UV-C lamp operating on rechargeable VDC batteries. The batteries can be held in a casing along with a UV bulb that can be removed from the device 10. The batteries can be then be recharged with an AC/DC converter. Other known rechargeable power sources can be substituted for the VDC batteries.

Figure 3:
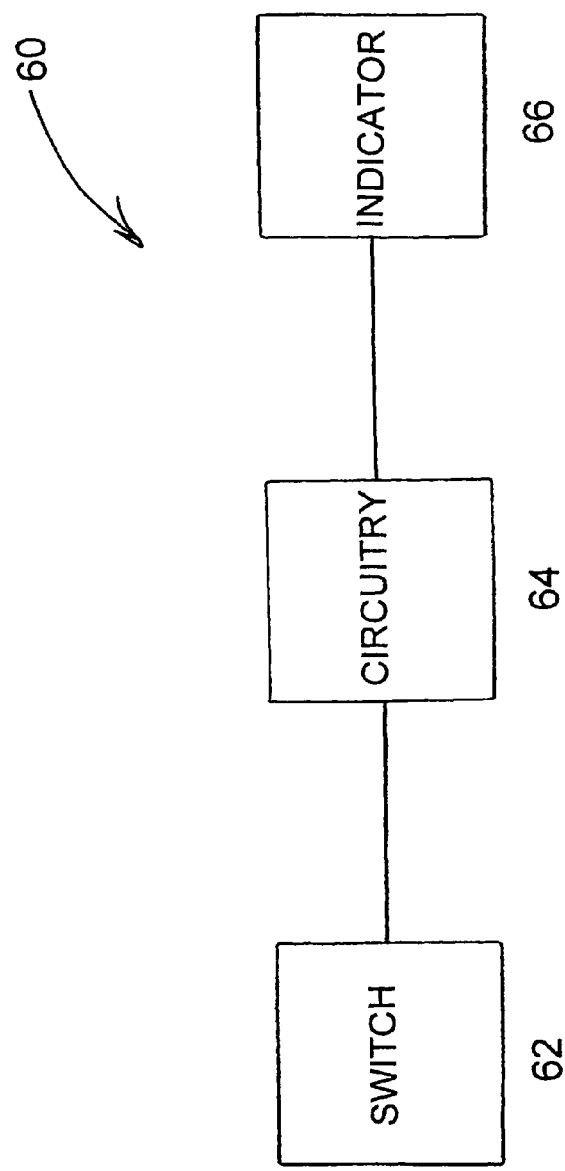
FIG. 3 is a flow chart showing an embodiment of a safety mechanism for use in conjunction with the disclosed device.

Embodiments exist that utilize safety mechanisms to help ensure that the UV light unit 36 is properly engaged prior to use. For instance, one embodiment provides and audible and/or visible warning when the light source is not properly engaged with the device. With reference to FIG. 3, an embodiment of the safety mechanism 60 comprises a sensor switch 62, internal circuitry 64 and an indicator 66. Nonlimiting examples of a suitable sensor switch include an on/off micro switch or a magnetic sensitive switch. When the UV light unit is not properly engaged with the device 10, the switch electronically triggers an indicator alerting the user. In one example, the switch triggers an LED to light up. Another embodiment exists wherein the internal circuitry measures the battery capacity and triggers an alert if the capacity is too low to support the UV lamp.

While a preferred embodiment of the disclosed UV liquid storage and dispensing device has been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. A water pitcher filter comprising:
a water pitcher having a base, body, handle and spout;
a liquid chamber within said body and occupying only an upper portion thereof, comprising:
a filtration compartment divided by a removable and replaceable filter into an upper reservoir and a lower collector chamber, said filter containing filter media capable of removing minerals from water;
an ultraviolet treatment compartment having an ultraviolet light source contained therein, said filtration compartment and said ultraviolet treatment compartment being separated by a vertical partition defining a liquid passage at a lowermost end thereof; and
an exit opening at an upper end of said ultraviolet treatment compartment, wherein said exit opening and said liquid passage are sufficiently narrow so that filtered liquid remains in the ultraviolet treatment compartment for a duration sufficient for ultraviolet light emitted from said ultraviolet light source to kill 99% of the pathogens present in water being treated prior to exiting said ultraviolet treatment compartment;
wherein water to be treated is introduced into said upper reservoir, passes though said filter into said lower collector chamber under the action of gravity, then passes through said liquid passage into said ultraviolet treatment compartment, where it is subjected to ultraviolet radiation, and subsequently flows through said exit opening.

* * * * *

UNITED STATES PATENT AND TRADEMARK OFFICE
CERTIFICATE OF CORRECTION

PATENT NO.         : 8,128,820 B2  
APPLICATION NO.    : 12/380191  
DATED              : March 6, 2012  
INVENTOR(S)        : Wu Page 1 of 1

It is certified that error appears in the above-identified patent and that said Letters Patent is hereby corrected as shown below:

Column 4, line 39:

Delete "though" and insert --through--.

Signed and Sealed this
Twenty-ninth Day of May, 2012

David J. Kappos
*Director of the United States Patent and Trademark Office*